Figure 1:
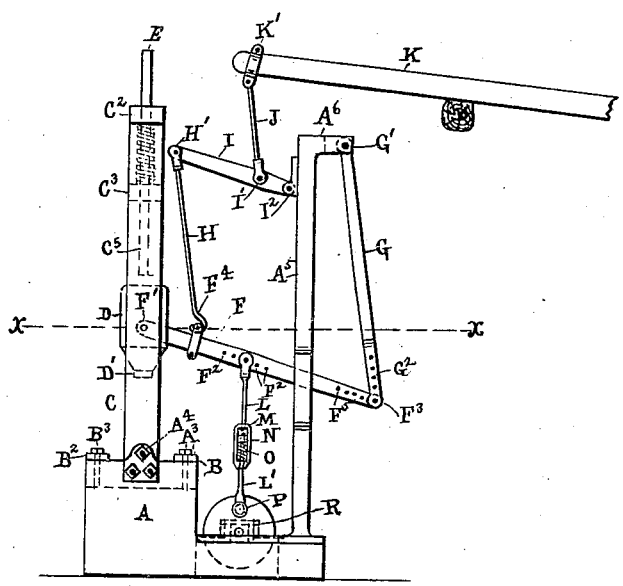

(No Model.) 2 Sheets—Sheet 1.

G. & J. T. GOLCHER.
MACHINE FOR FORGING CARRIAGE BOLTS.

No. 258,641. Patented May 30, 1882.

Witnesses:
Frank P. Kinsey
Daniel C. Heller

Inventors.
George Golcher
John T. Golcher
pr Thomas P. Kinsey Atty (No Model.) 2 Sheets—Sheet 2.

G. & J. T. GOLCHER.
MACHINE FOR FORGING CARRIAGE BOLTS.

No. 258,641. Patented May 30, 1882.

Witnesses:
Frank P Kinsey
Samuel T. P. Kinsey

Inventors.
George Golcher
John T. Golcher
per Thomas P. Kinsey
Atty

UNITED STATES PATENT OFFICE.

GEORGE GOLCHER AND JOHN T. GOLCHER, OF READING, PENNSYLVANIA.

MACHINE FOR FORGING CARRIAGE-BOLTS.

SPECIFICATION forming part of Letters Patent No. 258,641, dated May 30, 1882.

Application filed July 11, 1881. (No model.)

*To all whom it may concern:*

Be it known that we, GEORGE GOLCHER and JOHN T. GOLCHER, of the city of Reading, county of Berks, State of Pennsylvania, have invented a new and useful Improvement in Machines for Forging Carriage-Bolts, of which the following is a specification.

This improvement is applicable to all hammers designed for light work and rapid movement, the blow being delivered vertically, but, as shown in the drawings, is more particularly designed for the forging of carriage-bolts.

Figure 2:
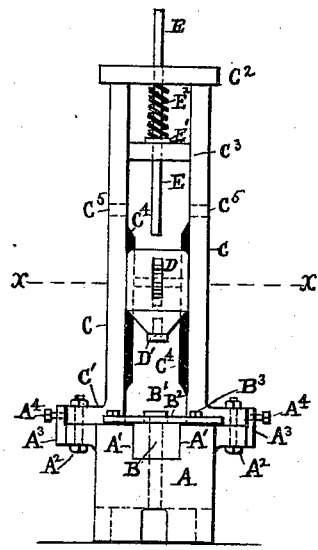
Figure 3:
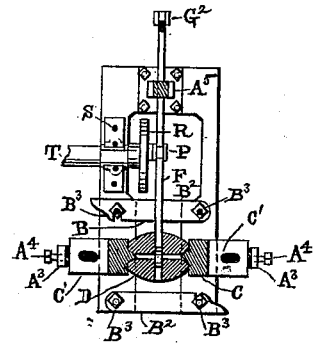
Figure 4:
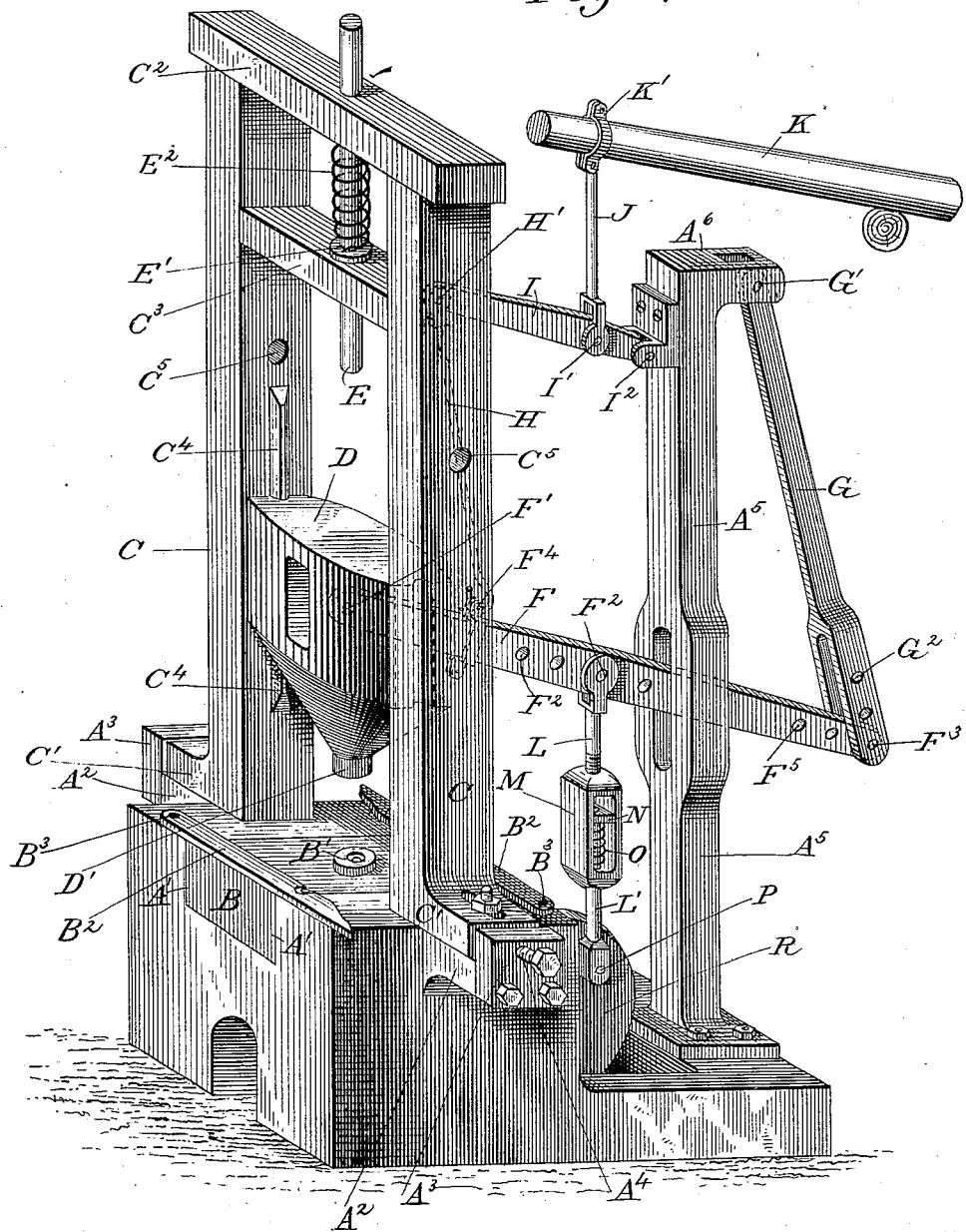

Referring to the drawings herewith, in which similar figures denote similar parts, Figure 1 is an elevation on the crank side of the machine; Fig. 2, a front elevation of the machine; Fig. 3, a plan of the machine, the guides being cut on the line $x\ x$ of Figs. 1 and 2. Fig. 4, Sheet 2, is a perspective view of our improved power-hammer.

In all of the above figures, A represents the anvil or base of the machine; $A'$, a recess to receive the die-holder; $A^2$, ears to which the standards are secured; $A^3$, wrought-iron ears bolted to the anvil and having bolts $A^4$ for the adjustment of the standards; $A^5$, back post; $A^6$, arm to the back post; B, the die-holders; $B'$, the die; $B^2$, die-holder clamps, and $B^3$ clamping-bolts.

C C are the standards, having feet $C'$, cap $C^2$, cross-bar $C^3$, and guides $C^4$.

D is the hammer; $D'$, the die, and E a reaction spindle or buffer having a collar, $E'$, and a spiral or gum spring, $E^2$.

F is the hammer helve or lever, provided with the hammer-head, pivot $F'$, a series of holes, $F^2$, for the connecting-rod pin, and a series of holes, $F^5$, for the fulcrum-pin $F^3$.

G is the suspension-link for the hammer-helve, and is provided with a suspension-head and pin, $G'$, and a series of holes, $G^2$, for the fulcrum-pin $F^3$ of the hammer-helve. Said link is suspended by the arm $A^6$ from the back post, $A^5$.

H is a connecting-link between the hammer-helve and the compound lever I above it. It has a jaw, $H'$, to receive the end of the lever I, and is connected to the helve by a hook-and-eye joint on the clamp $F^4$. The compound lever I is suspended from the back post by a jaw, $I^2$, and has a pin, $I'$, for the suspension-link J of the spring-pole K. The spring-pole link J has jaws at the lever end and is secured between the jaws of the clip $K'$ at its upper end.

K is a spring-pole of the usual character, and L is the connecting-rod, which is divided into two parts, the upper portion having a jaw at the top clasping the hammer-helve at $F^2$, the lower end being threaded and screwed into the head of the swivel-link M. The lower portion of said rod has a head fitted to the crank-pin P, and is also threaded at the opposite end, passes freely through the lower head of the swivel-link, and is screwed into a nut, N, which slides within the jaws or legs of the swivel-link.

M is the swivel-link, having one end threaded for the upper part of the connecting-rod and the lower end bored and plain to slide freely over the lower part of the connecting-rod.

N is the nut for the lower part of the rod, and O a spiral spring resting upon the top of the lower head of the swivel-link and capped by the nut N, the lower part of the connecting-rod being slipped through the swivel-link and spring and then screwed into the nut, thus retaining it in the swivel-link.

P is the crank-pin, R the crank-disk, and S a bearing upon the anvil-frame for the crank-shaft. This shaft is provided with a belt-pulley and a friction-coupling controlled by a foot-lever secured to the frame. Back of the disk-crank are spring-catches, so arranged with relation to a rear extension of the crank-pin (and also controlled by the foot-lever) that as long as the foot is pressing on the lever the hammer will operate and the rear extension of the crank-pin will clear the catches; but the moment the foot releases the lever the friction is thrown out of gear and the catches are drawn within range of the pin and hold it, bringing the hammer to rest. This arrangement is not shown in the drawings, as we make no claim to the same, it being an old device on bolt-machines.

It has long been a desideratum in carriage-bolt making to have a machine adapted to the work in its various phases; but since the advent of the Oliver foot-power hammer there has been but little done to meet the want.

The Oliver and power-hammers of a similar character work with parted or half dies, one half in the anvil, the other half in the hammer. The serious objection to this mode of working is, first, the difficulty of keeping the dies in order, and, second, the impossibility of avoiding seam-marks on the inner face of the head and the liability of the shank under the head being out of square. It is also almost a mechanical impossibility to form a square shoulder to the shank or under the head, and many kinds of carriage-bolts must still be made by hand on this account, particularly whiffletree, elliptic-head, stop, and T-head shaft bolts. The blow in the machines described, being part of the arc of a circle, cannot be arranged to work parallel pieces of different sizes without a special adjustment of the dies for each size worked.

In the operation of our machine the blow is a vertical one and delivered parallel with the anvil-face. The anvil is pierced beneath the die for its full depth, so that bolts may be inserted, shanked, and headed of any length within the scope of the machine. The heading-die D' is first placed in the hammer D, and then the shank or female die B' is placed in the die-holder B. The latter being adjusted to correspond with the hammer-die, the length of iron (previously cut) is placed in the anvil-die, the foot touched to the lever operates the friction device, the disk-crank R is revolved, and the connecting-rod L draws down the helve F, and with it the hammer D, which, striking on the bar, upsets it sufficiently to fill out the square corners of the shank and form the head. The drawing down of the helve F also draws down the compound lever I, (by the link H,) and through the link J the spring-pole K, which, as soon as the blow has been struck, retracts and raises the hammer from the face of the work. The arrangement of spring-swivel in the rod L gives an elastic motion to the levers and a blow similar to what would be delivered by a hand operator.

To counteract the sudden rise of the hammer and keep its momentum within practical limits, we have, in connection with the spring-swivel in the connecting-rod, placed above the hammer, and projecting down between the guides, a spindle-buffer, E, arranged as shown, with a collar, E', and spiral or gum spring $E^2$, which receives the upward throw or spring of the hammer and absorbs the momentum in the compression of the spring $E^2$. This arrangement prevents any tendency of the helve F, compound lever I, and pole-spring K to bring an undue strain upon the working parts, and thus permits a very rapid movement of the same. The movement of the helve F, hammer D, and suspension-link G resembles as closely as machinery can simulate the handling of a smith's hammer by a smith, the fulcrum G' representing the shoulder-joint and the joint $F^3$ the elbow; and we can practically with the proper dies produce work in all respects similar to hand-work, while the expense of keeping up the dies is not one-fourth of that under the system of half or parted dies. Where the shank or head to be made is so large that the material to be pressed into the female die would project so much above the same as to make the filling out problematical, we upset the bar to a certain extent by a previous operation, reheating, and finishing up under the power-hammer.

Having described our invention, its mode of operation and advantages, we desire to secure by Letters Patent the following claims:

1. In a carriage-bolt-forging machine, the combination of the following elements: an anvil, A, provided with die-recess B, guide-standards C, back post, $A^5$, vertical drop-hammer D, spring cushion or buffer $E^2$, mounted on spindle E, having collar E', helve F, suspension-link G, and suspension-rods H and J, intermediate or compound lever, I, with fulcrum-plate I', clips $F^4$ and K', connecting-rod L L', provided with swivel-link M, nut N, and spring O, all arranged to be operated by suitable mechanism, through the crank-pin P, on the disk R, substantially as shown, and for the purpose described.

2. A vertically-guided hammer, D, in combination with a reciprocating helve, F, suspension-link G, links H and J, lever I, fulcrum-plate $I^2$, and spring-pole K, substantially as shown, and for the purpose set forth.

3. The compound lever I and its fulcrum-plate $I^2$, in combination with the hammer D, suspension-link G, crank-pin P, spring-pole K, the links J H, helve F, connecting-rod L L', and fulcrum-pin $F^3$, substantially as shown, and for the purpose specified.

4. The suspension-link G, having a bifurcated end, provided with a series of holes, $G^2$, and suspended from the back post, $A^5$, by the arm $A^6$, in combination with the hammer D, crank-pin P, spring-pole K, fulcrum-pin $F^3$, helve F, connecting-rod L L', links H and J, and lever I, substantially as shown, and for the purpose set forth.

GEORGE GOLCHER.
JOHN T. GOLCHER.

Witnesses:
JAMES R. KENNEY,
WAYNE HAYMAN.